(12) United States Patent
Huan et al.

(10) Patent No.: US 10,422,815 B2
(45) Date of Patent: Sep. 24, 2019

(54) SCANNING HEAD OF SCANNING PROBE MICROSCOPE

(71) Applicant: INSTITUTE OF PHYSICS, CHINESE ACADEMY OF SCIENCES, Beijing (CN)

(72) Inventors: Qing Huan, Beijing (CN); Zebin Wu, Beijing (CN); Hongjun Gao, Beijing (CN)

(73) Assignee: INSTITUTE OF PHYSICS, CHINESE ACADEMY OF SCIENCES, Beijing (CN)

(*) Notice: Subject to any disclaimer, the term of this patent is extended or adjusted under 35 U.S.C. 154(b) by 0 days.

(21) Appl. No.: 16/102,833

(22) Filed: Aug. 14, 2018

(65) Prior Publication Data

US 2019/0056429 A1 Feb. 21, 2019

(30) Foreign Application Priority Data

Aug. 17, 2017 (CN) .......................... 2017 1 0704690

(51) Int. Cl.
*G01Q 70/10* (2010.01)
*G01Q 30/20* (2010.01)
*G01Q 70/14* (2010.01)
*G01Q 70/02* (2010.01)

(52) U.S. Cl.
CPC ............ *G01Q 70/10* (2013.01); *G01Q 30/20* (2013.01); *G01Q 70/02* (2013.01); *G01Q 70/14* (2013.01)

(58) Field of Classification Search
CPC ........ G01Q 70/10; G01Q 70/02; G01Q 70/14; G01Q 30/20
USPC ...................................................... 850/52, 56
See application file for complete search history.

(56) References Cited

U.S. PATENT DOCUMENTS 5,041,783 A * 8/1991 Ohta ...................... G01Q 60/16
324/96

* cited by examiner

*Primary Examiner* — Nicole M Ippolito
*Assistant Examiner* — Hanway Chang
(74) *Attorney, Agent, or Firm* — Zhong Law, LLC

(57) ABSTRACT

A scanning head of a scanning probe microscope includes a scanning head frame having a first end portion and a second end portion which are oppositely disposed, the first end portion and the second end portion defining a first receiving space and a second receiving space, respectively; a sample table located in the first receiving space; a scanning module located in the second receiving space; and a plurality of fixed electrodes fixed on the second end portion of the scanning head frame. Signal lines of the scanning head of the present invention do not fall off or tear off during operation. In addition, the scanning head allows a laser to be incident on its scanning probe, enabling the scanning probe to be coupled with the laser, so that the range of application is wide.

11 Claims, 5 Drawing Sheets

SCANNING HEAD OF SCANNING PROBE MICROSCOPE

CROSS-REFERENCE TO RELATED APPLICATIONS

This application claims priority to China Patent Application No. CN 201710704690.2, filed Aug. 17, 2017, which is hereby incorporated by reference as though fully set forth herein.

FIELD OF THE INVENTION

The present invention relates to the field of scanning probe microscopes, and specifically relates to a scanning head of a scanning probe microscope.

BACKGROUND OF THE INVENTION

A scanning probe microscope (SPM) is a general term for various new probe microscopes (such as an atomic force microscope AFM, a laser force microscope LFM, a magnetic force microscope MFM, etc.) that are developed on the basis of scanning tunneling microscopes, and is a high-tech product integrating light, machine and electricity by comprehensively using modern scientific and technological achievements such as the optoelectronic technology, the laser technology, the weak signal detection technology, precision mechanical design and processing, the automatic control technology, the digital signal processing technology, the applied optics technology, computer high-speed acquisition and control, and the high-resolution graphics processing technology.

As a microscopic tool, the SPM has clear advantages compared with various previous microscopes and analytical instruments. Firstly, the SPM has a very high resolution and can easily "see" atoms, which is difficult to achieve by general microscopes or even electron microscopes. Secondly, the SPM obtains a real-time, high-resolution image of the real surface of a sample. Unlike some analytical instruments, the surface structure of the sample is estimated by indirect or computational methods. Thirdly, the SPM has no strict requirements for operating environment. It can be used not only in a vacuum, but also in an atmosphere at a low temperature, normal temperature, high temperature, and even in a solution. Therefore, the SPM is suitable for scientific experiments in various working environments.

However, the commercially available scanning heads adopt a design that exposes the signal lines outside the scanning head. Since the scanning head has a very thin signal line with a small solder joint, it is necessary to be very careful when installing and operating the scanning head because the signal line is easy to be tear off and difficult to be maintained.

SUMMARY OF THE INVENTION

In view of the above technical problems existing in the prior art, embodiments of the present invention provide a scanning head of a scanning probe microscope, including:
 a scanning head frame having a first end portion and a second end portion which are oppositely disposed, the first end portion and the second end portion defining a first receiving space and a second receiving space, respectively;
 a sample table located in the first receiving space;
 a scanning module located in the second receiving space; and
 a plurality of fixed electrodes fixed on the second end portion of the scanning head frame.

Preferably, the scanning head includes curved wires connected between output terminals of the scanning module and the plurality of fixed electrodes.

Preferably, the wires are spiral.

Preferably, the scanning head further includes an electrode limiting member fixed on an end face of the second end portion of the scanning head frame, and the electrode limiting member includes a plurality of limiting holes for passing through by the plurality of fixed electrodes.

Preferably, a side wall of the scanning head frame is provided with a light inlet and a light outlet which are oppositely disposed.

Preferably, a side wall of the scanning head frame is provided with a sample inlet located between the light inlet and the light outlet.

Preferably, the scanning head further includes a Pan's stepper motor located in the second receiving space, where the Pan's stepper motor has an adjusting knob, and a side wall of the scanning head frame is provided with an operation through-hole for the adjusting knob of the Pan's stepper motor to extend out.

Preferably, the operation through-hole and the sample inlet are located on the same side wall of the scanning head frame.

Preferably, the displacement of the Pan's stepper motor for driving the scanning module towards the sample table is shorter than a maximum extension length of the wires.

Preferably, the sample table includes:
 a movable sample clamp configured to clamp a sample piece;
 a drive device configured to drive the movable sample clamp to move in a plane;
 a fixing member connected to the drive device, the fixing member being fixed to the second end portion of the scanning head frame; and
 three extraction electrodes fixed on the fixing member.

Preferably, the scanning head frame is integrally formed.

The signal line of the scanning head of the present invention does not fall off or tear off during operation. In addition, the scanning head allows a laser to be incident on its scanning probe, enabling the scanning probe to be coupled with the laser, so that the application range is wide. The scanning head of the present invention adopts the modular design with a compact structure, which saves manufacturing and maintenance costs.

BRIEF DESCRIPTION OF THE DRAWINGS

Embodiments of the present invention are further described with reference to the accompany drawings, in which.

DETAILED DESCRIPTION OF THE INVENTION

To make objectives, technical solutions, and advantages of the present invention clearer, the present invention will be further described in detail below with reference to the accompanying drawings.

Figure 1:
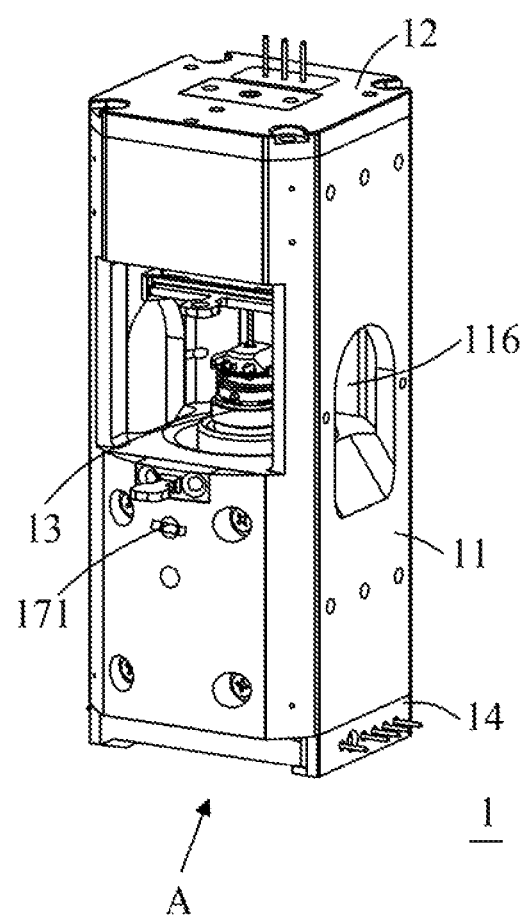
FIG. 1 is a schematic perspective view of a scanning head according to a preferred embodiment of the present invention.

FIG. 1 is a schematic perspective view of a scanning head according to a preferred embodiment of the present invention. As shown in FIG. 1, a scanning head 1 includes a scanning head frame 11 having a substantially columnar shape; a sample table 12, a scanning module 13, and a Pan's stepper motor (not shown in FIG. 1) that are located in the scanning head frame 11; and an electrode fixing base 14 fixed on an end portion of the scanning head frame 11.

Figure 2:
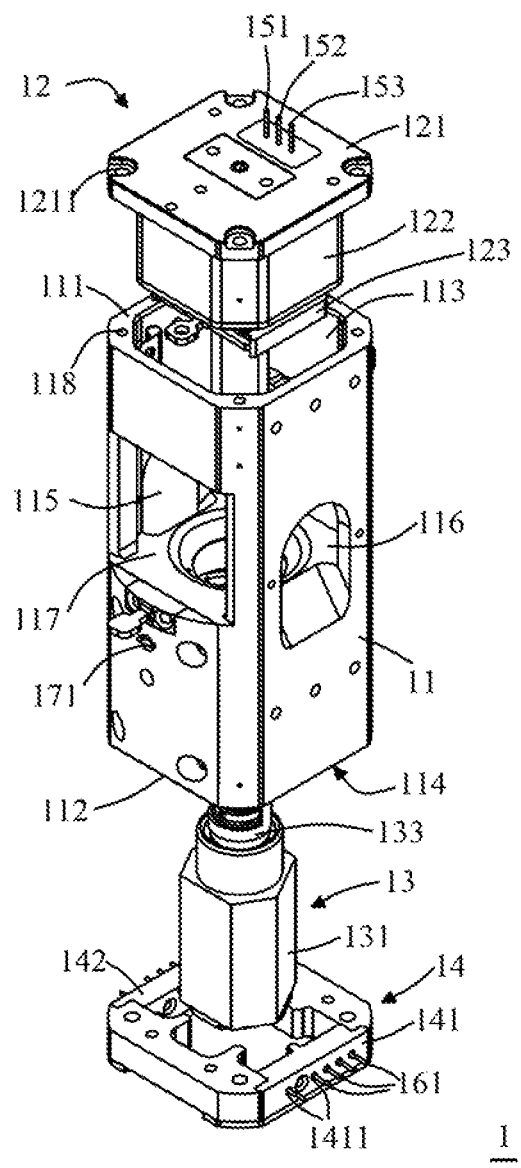
FIG. 2 is an exploded perspective view of the scanning head shown in FIG. 1.
Figure 3:
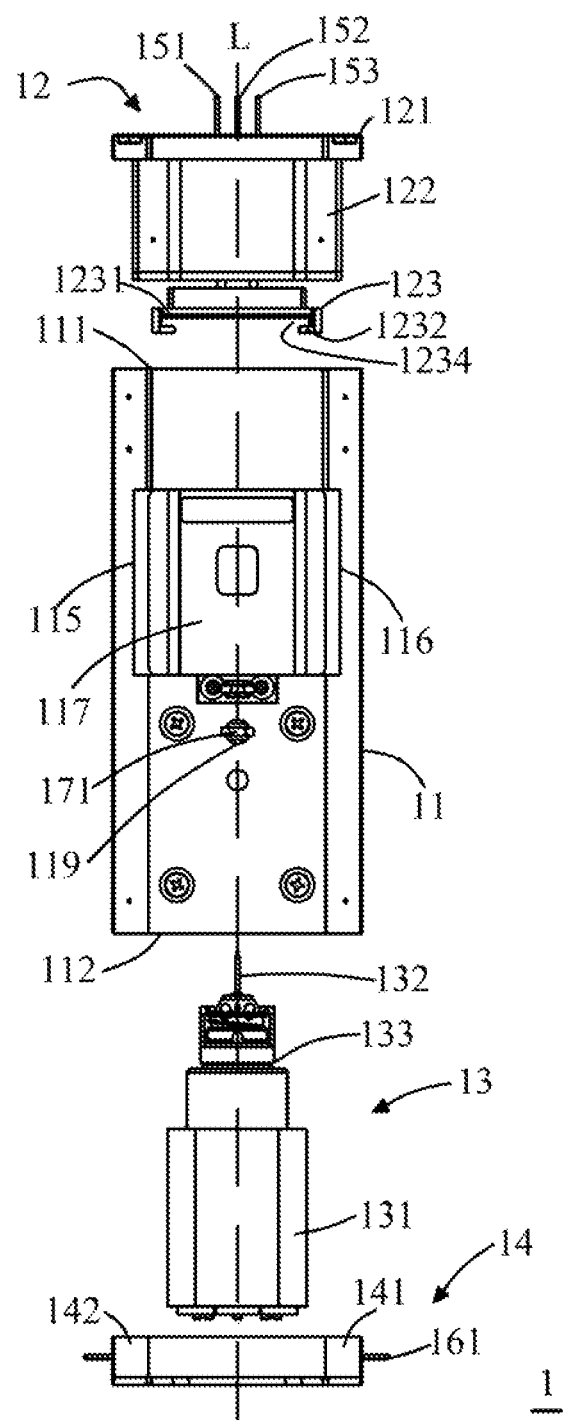
FIG. 3 is an exploded plan view of the scanning head shown in FIG. 1.

FIG. 2 is an exploded perspective view of the scanning head shown in FIG. 1, and FIG. 3 is an exploded plan view of the scanning head shown in FIG. 1. As shown in FIG. 2 and FIG. 3, the integrally formed scanning head frame 11 is substantially rectangular and has a columnar shape with an axis L. An annular side wall of the scanning head frame 11 is provided with a light inlet 115 and a light outlet 116 that are oppositely disposed, and an sample inlet 117 located between the light inlet 115 and the light outlet 116. The scanning head frame 11 includes end portions 111 and 112 that are oppositely disposed. The end portion 111 of the scanning head frame 11 defines a receiving space 113 for receiving the sample table 12 and adapted to the shape of the sample table 12. Another end portion 112 of the scanning head frame 11 defines a receiving space 114 for receiving the commercially available Pan's stepper motor (only its adjusting knob 171 is shown in FIG. 2 and FIG. 3) and the scanning module 13.

The sample table 12 includes a fixing member 121, a precise drive device 122, and a movable sample clamp 123 that are sequentially arranged. The fixing member 121 is plate-shaped and can be made of an insulation material such as polytetrafluoroethylene. Extraction electrodes 151, 152, and 153 that are configured to receive high-voltage drive signals are fixed on the fixing member 121 and extend from the fixing member 121. The extension direction of the extraction electrodes 151, 152, and 153 is parallel to the axis L. The fixing member 121 has four threaded holes 1211 that are aligned with four holes 118 in end face of the end portion 111 of the scanning head frame 11, respectively, for fixing the sample table 12 on the scanning head frame 11 via bolts or screws (not shown in FIG. 2 and FIG. 3).

The precise drive device 122 may be a commercial precise drive device, and its core components include two piezoelectric ceramic sheets perpendicular to each other (not shown in FIG. 2 and FIG. 3). Two electrodes of one piezoelectric ceramic sheet are electrically connected to the extraction electrodes 151 and 153, respectively, via signal lines, and two electrodes of the other piezoelectric ceramic sheet are electrically connected to the extraction electrodes 152 and 153, respectively, via signal lines. After receiving high-voltage drive signals, the extraction electrodes 151, 152, and 153 may precisely control the amounts of deformation of the piezoelectric ceramic sheets based on the inverse piezoelectric effect. The amounts of deformation of the two piezoelectric ceramic sheets are perpendicular to the axis L, so that the movable sample clamp 123 can be accurately driven to move in a plane perpendicular to the axis L.

As shown in FIG. 3, the movable sample clamp 123 includes a moving plate 1231 linked to the two piezoelectric ceramic sheets, and L-shaped edge folds 1232 disposed at opposite ends of the moving plate 1231. The two L-shaped edge folds 1232 extend in a direction toward each other, thereby defining a plate-like sample receiving space 1234 together with the moving plate 1231 for receiving and carrying a sample piece.

The scanning module 13 includes a hexagonal prism-shaped housing 131, a scanning tube 133, and a scanning probe 132 located at an end portion of the scanning tube 133 (see FIG. 3). The scanning probe 132 is detachably mounted at the end portion of the scanning tube 133. When the scanning probe 132 needs to be replaced, the scanning probe 132 can be replaced by passing a mechanical arm (not shown in FIG. 2 and FIG. 3) through the sample inlet 117. A part of the scanning tube 133 is located in the housing 131 and is fixed to the housing 131. The housing 131 is connected to a drive component of the Pan's stepper motor, and by controlling the Pan's stepper motor, the scanning module 13 can be driven to move along the axis L, so as to precisely control a distance between the scanning probe 132 and the sample piece disposed in the movable sample clamp 123. The adjusting knob 171 of the Pan's stepper motor extends from an operation through-hole 119 on a side wall of the scanning head frame 11. The drive force for driving the scanning module 13 to move can be changed by rotating the adjusting knob 171 by another mechanical arm.

The electrode fixing base 14 is also fixed on an end face of the end portion 112 of the scanning head frame 11 via screws or bolts. The electrode fixing base 14 includes two oppositely disposed electrode limiting members 141 and 142 which are made of insulation materials such as polytetrafluoroethylene. The electrode limiting members 141 and 142 are each provided with a plurality of through-holes for passing through by a plurality of electrodes. FIG. 2 shows five limiting holes 1411 in the electrode limiting member 141 for passing through by five fixed electrodes 161, and the five fixed electrodes 161 are parallel to the end face of the end portion 112. The limiting holes 1411 have an aperture slightly greater than the diameter of the fixed electrode 161, so that the five fixed electrodes 161 can be closely embedded into the five limiting holes 1411 to prevent the fixed electrode 161 from falling off from the electrode limiting members 141 and 142.

Figure 4:
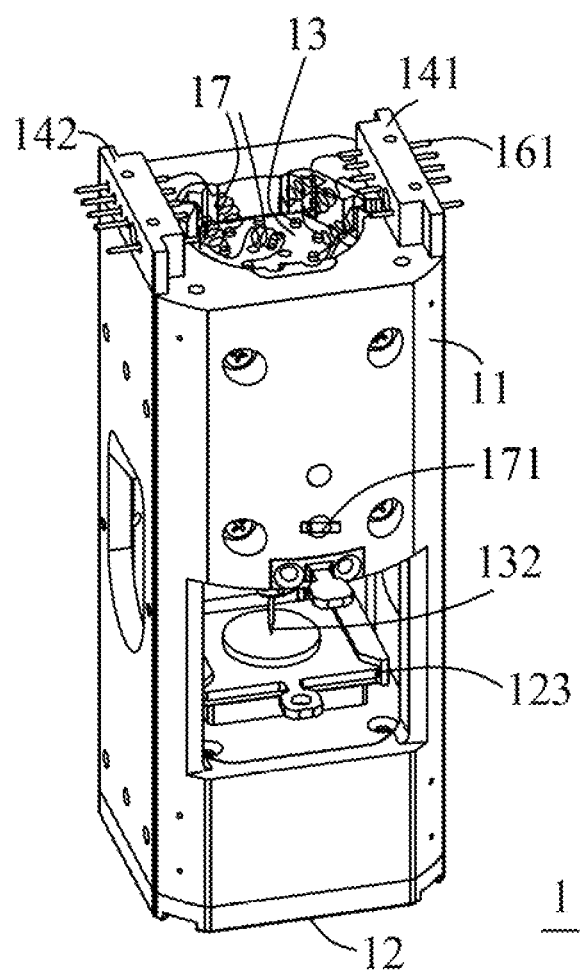
FIG. 4 is a schematic perspective view from the direction indicated by an arrow A in FIG. 1.

FIG. 4 is a schematic perspective view from the direction indicated by an arrow A in FIG. 1, and FIG. 4 is a schematic perspective view of the scanning head shown in FIG. 1 in a reverse direction. As shown in FIG. 4, the scanning head 1 also includes a plurality of (six in FIG. 4) spiral wires 17. One end of the wire 17 is welded on the fixed electrode 161, and the other end is welded on an output terminal of the scanning module 13. The wires 17 have a small elastic potential and are suitable for being stretched under a small force. In the process that the Pan's drive motor drives the scanning module 13 to move closer to the movable sample clamp 123, the scanning module 13 may drive the wires 17 together and stretch the wires 17. A maximum extension length of the spiral wires 17 is greater than a displacement of the scanning module 13 driven by the Pan's stepper motor towards the movable sample clamp 123, thereby avoiding the wires 17 from tearing off or falling off from the fixed electrodes 161. In addition, the fixed electrodes 161 are fixedly installed on the electrode limiting member 141. The wiring terminals of the external circuit do not directly contact the wires 17, so that no force can be applied to the wires 17.

Figure 5:
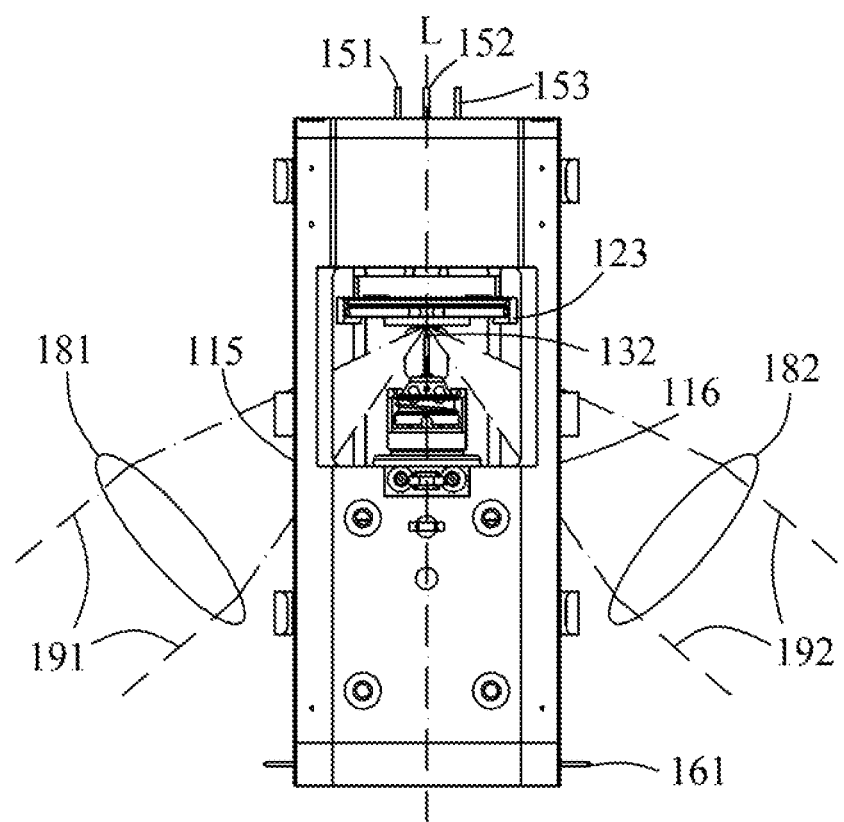
FIG. 5 is a schematic plan view of coupling of a scanning probe in the scanning head in FIG. 1 with the laser.

FIG. 5 is a schematic plan view of coupling of the scanning probe in the scanning head in FIG. 1 with a laser. As shown in FIG. 5, focusing lens 181 and 182 are arranged on two sides of the light inlet 115 and the light outlet 116 of the scanning head frame 11 with the axis L as a symmetrical axis. In order to simplify the view, FIG. 5 omits to show a focusing lens drive device for driving the focusing lens 181 and 182.

The focusing lens 181 is adjusted by the focusing lens drive device so that its optical axis is parallel to the incident direction of the laser 191, and the laser 191 is converged to the tip of the scanning probe 132 to be coupled with the scanning probe 132. The position of the focusing lens 182 is adjusted, so as to collect the coupled laser 192. Relative positions of the focusing lens 181 and 182 and the scanning probe 132 are kept unchanged. High-voltage drive signals are applied to the extraction electrodes 151, 152, and 153 to drive the sample piece in the movable sample clamp 123 to move in a plane perpendicular to the axis L, so as to analyze the spectral properties of materials or molecules on nanometer scale, and then study the energy level distribution of the materials or molecules. Thus, optical compatibility is realized and its range of application is extended.

In other embodiments of the present invention, the wires 17 are curved like a spiral, a wave, or the like.

The sample inlet 117 and the operation through-hole 119 are located on the same side wall of the scanning head frame, so that a plurality of mechanical arms may be conveniently arranged on the same side of the scanning head frame, which facilitates operation.

The scanning head frame 11 of the present invention adopts an integrally formed frame structure which has a compact structure and occupies a small volume.

The scanning head frame 11, the sample table 12, and the scanning module 13 of the present invention may be manufactured separately, and are very convenient to assemble and disassemble, thereby reducing maintenance time and cost.

The adjusting knob 171 of the Pan's stepper motor of the present invention extends out of the scanning head frame 11, thereby facilitating adjustment of the drive force for driving the scanning module 13.

Although the present invention has been described by way of the preferred embodiments, the present invention is not limited thereto, and also includes various changes and modifications made without departing from the scope of the invention.

The invention claimed is:

1. A scanning head of a scanning probe microscope, comprising:
   a scanning head frame having a first end portion and a second end portion that are oppositely disposed, the first end portion and the second end portion defining a first receiving space and a second receiving space, respectively;
   a sample table located in the first receiving space;
   a scanning module located in the second receiving space; and
   a plurality of fixed electrodes fixed on the second end portion of the scanning head frame.

2. The scanning head of the scanning probe microscope according to claim 1, further comprising curved wires connected between output terminals of the scanning module and the plurality of fixed electrodes.

3. The scanning head of the scanning probe microscope according to claim 2, wherein the wires are spiral.

4. The scanning head of the scanning probe microscope according to claim 2 wherein a side wall of the scanning head frame is provided with a light inlet and a light outlet that are oppositely disposed.

5. The scanning head of the scanning probe microscope according to claim 4, wherein a side wall of the scanning head frame is provided with a sample inlet located between the light inlet and the light outlet.

6. The scanning head of the scanning probe microscope according to claim 5, further comprising a Pan's stepper motor located in the second receiving space, the Pan's stepper motor includes an adjusting knob, and a side wall of the scanning head frame is provided with an operation through-hole for the adjusting knob of the Pan's stepper motor to extend out.

7. The scanning head of the scanning probe microscope according to claim 6, wherein the operation through-hole and the sample inlet are located on the same side wall of the scanning head frame.

8. The scanning head of the scanning probe microscope according to claim 6, wherein the displacement of the Pan's stepper motor for driving the scanning module towards the sample table is less than a maximum extension length of the wires.

9. The scanning head of the scanning probe microscope according to claim 1, further comprising an electrode limiting member fixed on an end face of the second end portion of the scanning head frame, and the electrode limiting member has a plurality of limiting holes for passing through by a plurality of fixed electrodes.

10. The scanning head of the scanning probe microscope according to claim 1, wherein the sample table comprises:
    a movable sample clamp configured to clamp a sample piece;
    a drive device configured to drive the movable sample clamp to move in a plane;
    a fixing member connected to the drive device, the fixing member being fixed to the second end portion of the scanning head frame; and
    three extraction electrodes fixed on the fixing member.

11. The scanning head of the scanning probe microscope according to claim 1, wherein the scanning head frame is integrally formed.

* * * * *